(12) United States Patent
Van Duren et al.

(10) Patent No.: US 11,262,746 B1
(45) Date of Patent: Mar. 1, 2022

(54) SIMULTANEOUSLY COST-OPTIMIZED AND POLICY-COMPLIANT TRAJECTORY GENERATION FOR UNMANNED AIRCRAFT

(71) Applicants: Drew F. Van Duren, Templeton, CA (US); Raja Sengupta, El Cerrito, CA (US); Christian G. Manasseh, Falls Church, VA (US)

(72) Inventors: Drew F. Van Duren, Templeton, CA (US); Raja Sengupta, El Cerrito, CA (US); Christian G. Manasseh, Falls Church, VA (US)

(73) Assignee: sevama, LLC, Falls Church, VA (US)

( * ) Notice: Subject to any disclaimer, the term of this patent is extended or adjusted under 35 U.S.C. 154(b) by 270 days.

(21) Appl. No.: 16/443,103

(22) Filed: Jun. 17, 2019

Related U.S. Application Data

(60) Provisional application No. 62/687,729, filed on Jun. 20, 2018.

(51) Int. Cl.
  *G05D 1/00* (2006.01)
  *G08G 5/00* (2006.01)
  (Continued)

(52) U.S. Cl.
  CPC ......... *G05D 1/0005* (2013.01); *B64C 39/024* (2013.01); *G01C 21/20* (2013.01);
  (Continued)

(58) Field of Classification Search
  CPC .................................................... G05D 1/005
  See application file for complete search history.

(56) References Cited

U.S. PATENT DOCUMENTS 8,116,959 B2   2/2012   Laberteaux et al.
9,783,293 B2  10/2017   Srivastava et al.
(Continued)

FOREIGN PATENT DOCUMENTS

CN           106919181 A    10/2016

OTHER PUBLICATIONS

Liu, Zhilong, "Ph.D. thesis: Unmanned aircraft systems flight planning: System development and feasibility study", Fall 2017, Publisher: Dissertations & Theses @ University of California; ProQuest Dissertations & Theses A&I ProQuest Dissertations & Theses Global. (2031548923).

*Primary Examiner* — Jean Paul Cass
(74) *Attorney, Agent, or Firm* — Charles A. Lemaire; Jonathan M. Rixen; Lemaire Patent Law Firm, P.L.L.C.

(57) ABSTRACT

A flight processor that calculates a 4-dimensional trajectory having a sequence of two or more position, time and cost (x, y, z, t, c) tuples that minimize a defined cost. Some embodiments generate cost-optimized trajectories with simple or complex constraints and bounds such as fixed AGL altitude; minimum AGL altitude; maximum AGL altitude; minimum MSL; maximum MSL; avoidance of restricted airspace; adherence to non-restricted airspace such as easements; adherence to ground-based guideways, if applicable; and the constraint to maintain adequate radio frequency signal-to-noise needed for communications to the ground station or backhaul systems. Constraint-enabled minimization of trajectory cost may leverage the aircraft's energy model; current atmospheric data (most notably wind vector data along the trajectory path); continuous-time and/or event-based risk models and fault trees; blacklisted and white-listed geo-fence boundaries; defined easements; and known or estimated RF signal-to-noise (SNR) minimum values needed for one or two-way communications.

25 Claims, 10 Drawing Sheets

(51) Int. Cl.
*B64C 39/02* (2006.01)
*G01C 21/20* (2006.01)

(52) U.S. Cl.
CPC ......... *G08G 5/0034* (2013.01); *G08G 5/0069* (2013.01); *B64C 2201/141* (2013.01)

(56) References Cited

U.S. PATENT DOCUMENTS

| | | | | |
|---|---|---|---|---|
| 10,013,236 | B2* | 7/2018 | Bailey | G06F 7/00 |
| 10,109,209 | B1* | 10/2018 | Buchmueller | B64C 39/02 |
| 10,332,405 | B2* | 6/2019 | Kopardekar | G08G 5/006 |
| 10,351,261 | B1* | 7/2019 | Bryant | B64F 1/362 |
| 10,388,170 | B2* | 8/2019 | De Villele | G01C 21/14 |
| 10,528,043 | B2* | 1/2020 | O'Laughlin | G08G 5/0021 |
| 10,546,260 | B2* | 1/2020 | Liao | G06Q 30/00 |
| 10,890,659 | B2* | 1/2021 | Fucke | G01S 7/285 |
| 2012/0143505 | A1* | 6/2012 | Giovannini | G08G 5/0039 |
| | | | | 701/540 |
| 2015/0134150 | A1* | 5/2015 | Farjon | G05D 1/0202 |
| | | | | 701/3 |
| 2016/0140851 | A1 | 5/2016 | Levy et al. | |
| 2017/0278405 | A1 | 9/2017 | Yakan | |

* cited by examiner

FIG. 5    Cell Traversal Costs [Cx] as function of Risk

Total Risk Cost = ∑ Deterministic or Probabilistic Segment Risk Costs

C1, C2, C3, etc. may be based on system, environment and/or aircraft fault/failure tree (fault tree analysis) or other form of risk model where risk varies as function of time and/or location and other world model variables

SIMULTANEOUSLY COST-OPTIMIZED AND POLICY-COMPLIANT TRAJECTORY GENERATION FOR UNMANNED AIRCRAFT

CROSS-REFERENCE TO RELATED APPLICATION

This application claims priority benefit, under 35 U.S.C. § 119(e), of U.S. Provisional Patent Application 62/687,729, filed Jun. 20, 2018 by Drew F. Van Duren and titled "Simultaneously cost-optimized and policy-compliant trajectory generation for unmanned aircraft," which is incorporated herein by reference in its entirety.

FIELD OF THE INVENTION

The present invention relates to flight optimization for flying drones and more particularly to a method and device that computes cost-optimized and policy-constrained trajectories for unmanned aerial systems (UAS) during flight planning, normal in-flight, post-flight analysis and contingency flight guidance decision making operations. Moreover, the invention incorporates and generates optimized trajectories from additional constraints such as variable altitudes and distances from airspace and ground constructs, risk, mission-specific communication requirements, and sensor performance thresholds.

BACKGROUND

Cost and energy-optimized aviation flight planning for manned aircraft is a well-understood domain, typically leveraging aircraft energy consumption models, weight, wind, power settings and control surface configuration to compute an optimized flight consisting of climbout, enroute and descent phases—sometimes constrained by waypoints—to a final destination. Enroute energy optimization in manned flight is typically performed using constant mean-sea-level (MSL) flight segments wherein wind vectors and atmospheric conditions are forecast or sensed along published or dynamically specified airways. Cost minimization calculations may be performed using a variety of known algorithms, for example Dijkstra, Fast Marching, ordered upwind, shooting, co-location and other special case numerical methods that may be optimized and constrained using various meshing strategies and cost inputs/manipulations for the needed calculations.

Small Unmanned Aircraft frequently fly at much lower altitudes and airspeeds in the earth's boundary layer wherein wind vector components can grossly overpower the flight vehicle, cause reduced or negative ground speeds, and impose significant mission risk on operators. Battery or fuel reserves must be able to accommodate frequent and unexpected contingencies, especially for autonomous or beyond-line-of-sight (BLOS) flight in which unanticipated wind may negate the feasibility of reaching the desired destination. In addition, more energy is expended for each unit of battery or fuel weight being carried, therefore significant optimization tradeoffs must be made. This is frequently known in aviation as the fuel loading problem. Small unmanned aircraft typically fly shorter distances based on available energy reserves and fly at lower altitudes to accommodate sensor proximity and resolution requirements and satisfy airspace regulations. Given these characteristics, many UAS operational paradigms favor a constant above-ground-level (AGL) flight pattern when not taking off or landing. Prior art on which the present claims are based include a published UC Berkeley PhD thesis (Liu, Z. (2017). *Unmanned aircraft systems flight planning: System development and feasibility study* (Order No. 10641917). Available from Dissertations & Theses @ University of California; ProQuest Dissertations & Theses A&I; ProQuest Dissertations & Theses Global. (2031548923)) wherein a trajectory is cost-energy-optimized in a 3-D mesh for constant, low-altitude AGL flight cognizant of restricted areas, obstacles, and a UAS energy consumption and expenditure model. This prior art introduces a simplistic cost function based solely on energy consumption and the vehicle's available energy. The invention disclosed herein adds to a computing apparatus ("flight processor apparatus") constraint-related optimizations and thresholds not only to energy-related cost functions, but also to simple and complex cost functions that may optimize or constraint-optimize a trajectory based on fuel costs, arrival time, and/or risk.

United States Patent Application Publication US 2016/0140851 by Levy et al. published on May 19, 2016 with the title "Systems and Methods for Drone Navigation," and is incorporated herein by reference. Publication US 2016/0140851 describes a method for navigation of a drone through a geographical air space, comprising: identifying a drone within or in proximity to a geographical air space; receiving flight data representing a certain flight path through the geographical air space; evaluating the flight data based on a flight risk map to determine the flight risk through the geographical air space, wherein the flight risk map includes zones, each zone being associated with a certain flight safety score; and one or more of: approving the certain flight path when the flight risk of the drone is within an acceptable risk threshold, blocking the certain flight path when the flight risk of the drone is outside the acceptable risk threshold, and obtaining external control of navigation of the drone to navigate the drone through at least one zone having the acceptable risk threshold.

United States Patent Application Publication US 2017/0278405 by Yakan published on Sep. 28, 2017 with the title "Drone Traffic Engineering," and is incorporated herein by reference. Publication US 2017/0278405 describes a method that includes receiving a request for a flight path for a drone, the request including information indicative of a source location within a geographical area and a destination location within the geographical area, modeling the geographical area including a plurality of geographical regions as a data network including a plurality of nodes, determining a network data path from a source node of the plurality of nodes corresponding to the source location to a destination node of the plurality of nodes corresponding to the destination location, determining a flight path for the drone based on the network data path, and transmitting data indicative of the flight path for the drone.

U.S. Pat. No. 9,783,293 to Srivastava, et al. issued on Oct. 10, 2017 with the title "Unmanned aerial vehicle platform," and is incorporated herein by reference. U.S. Pat. No. 9,783,293 describes a device that receives a request for a flight path of UAV from a first location to a second location in a region, and determines, based on credentials associated with the UAV, whether the UAV is authenticated for utilizing the device and a network. The device determines, when the UAV is authenticated, capability information for the UAV based on the request and component information associated with the UAV. The device calculates the flight path from the first location to the second location based on the capability information and one or more of weather information, air traffic information, obstacle information, or regulatory information associated with the region. The device generates flight path instructions for the flight path based on one or more of the weather information, the air traffic information, the obstacle information, or the regulatory information associated with the region, and provides the flight path instructions to the UAV.

Chinese Patent Application Publication CN106919181A (according to Google translation) was filed on Oct. 20, 2016 with the title "Unmanned aerial vehicle obstacle avoidance method," and is incorporated herein by reference. CN106919181A (according to Google translation) describes an unmanned aerial vehicle obstacle avoidance method, which includes the steps of planning an initial flight path for an unmanned aerial vehicle; detecting position and speed information of an obstacle within a certain distance of the unmanned aerial vehicle by using a sensor in the flying process of the unmanned aerial vehicle; calculating whether collision occurs or not in flight according to the initial path by adopting a collision detection algorithm; working out a collision avoidance path by using a policy iteration algorithm according to a collision region information predicted by the collision detection algorithm and a destination of the unmanned aerial vehicle; correcting the collision avoidance path by using a backtracking method, and preventing the unmanned aerial vehicle from being caught in a local obstacle trap; and performing differential flattening processing on the corrected collision avoidance path according to dynamic performance characteristics of the unmanned aerial vehicle. According to the method provided, flight envelope restriction requirements of the unmanned aerial vehicle in reality are met, a common problem of local obstacle traps in the path planning algorithm is effectively avoided, and multiple obstacles can be avoided in real time under the premise of meeting the dynamic performance.

Therefore, a need exists for a flight-planning processor (used in a strategic or tactical flight planning or analysis process) to be able to compute various cost-optimization trajectories that simultaneously meet the flight vehicle's risk tolerance levels; stay within the vehicle's energy storage or output capabilities; adhere to restricted airspace constraints; accommodate minimum sensor requirements; factor in topography; adhere to ground routes (guideways, such as roads, wires and other ground features), when needed; guarantee sufficient one-way or two-way electromagnetic communications, when required; and most importantly, maximize the benefits and minimize the burdens of, highly variable wind vector patterns as they affect ground-constrained or cost-optimized free-space trajectories in a 4-dimensional (4-D) continuum.

BRIEF SUMMARY OF THE INVENTION

In some embodiments, the present invention includes a flight-processor apparatus able to calculate a 4-dimensional trajectory consisting of a sequence of two or more position (x, y, z) and time (t) tuples that minimize an operator-defined cost, and calculate the cost using a cost function as the means to define various constraints, whether policy or performance-based. Cost is frequently expressed as energy, arrival times, latency or other operator-defined values, terms that are in limited supply on the flight vehicle. The invention is able to compute energy and non-energy cost-optimized trajectories based on simple or complex cost-function input combinations (for the entire trajectory, or a component segment thereof) such as fixed above-ground-level (AGL) altitude; minimum AGL altitude; maximum AGL altitude; minimum altitude relative to mean-sea-level (MSL); maximum altitude relative to MSL; avoidance of restricted airspace; risk parameters that may incorporate an aircraft's discrete or continuous time and location risk model, world model and relation of the two via a fault/failure or attack tree; adherence to non-restricted airspace such as easements; adherence to ground or air-defined guideways, if applicable (including complex combinations of free space and guideway-driven trajectory components); minimum sensor needs, for example minimum or maximum proximity to sensed targets based on sensor resolution or other performance criteria; and the constraint to maintain adequate radio frequency signal-to-noise needed for communications to the ground station, other air vehicles, navigation aids (e.g., Global Positioning System (GPS) or GPS augmentation systems) or backhaul systems. Additionally, the invention includes hybrid cost function utilization wherein multiple cost-based constraints are simultaneously factored into discretized cost values calculated in the mesh and associated with traversing cells of the mesh trajectory as computed by a numerical cost optimization algorithm. The constrained minimization of trajectory total cost leverages the aircraft's energy model and current atmospheric data (most notably wind vector data along the trajectory path); blacklisted and white-listed geo-fence boundaries; sensor-specific performance constraints (e.g., resolution, time of day, gimbal angles, lighting conditions, and distance to sensed object); defined easements; and known or estimated radio frequency propagation models that define allowed and prohibited 4-D locations based on one or two-way effective isotropic radiated power (EIRP) needed to meet minimum UAS communication requirements to/from other fixed or mobile aircraft and ground-based transceivers. The invention incorporates other types of cost functions, non-energy-related, that may be utilized in path optimization. The invention also includes a method by which multiple trajectories, each cost-minimized using separate cost functions, may be integrated in a manner in which a final trajectory can meet cost constraints of each of the independently-produced trajectories within bounds of each one's thresholds.

BRIEF SUMMARY OF THE DRAWINGS

FIGS. 2, 2A and 2B show a schematic top-view diagram 200 of a computed optimized-cost flight path 120 that takes into account a plurality of wind vectors 220 and at least one restricted area 225 that is to be avoided during flight, according to some embodiments of the present invention. In some embodiments, the flight processor apparatus 110 (see FIG. 1) computes segment and total flight costs factoring wherein cost-function uses wind vector and restricted flight zone information for cost estimation and/or mesh construction. The restricted area 225 may be modeled either as either a region of the mesh removed 230 as shown in FIG. 2A that intersects the restricted area volume, or 240 high or infinite cost assigned to the mesh cells intersecting the restricted area as shown in FIG. 2B.

DETAILED DESCRIPTION OF THE INVENTION

Figure 1:
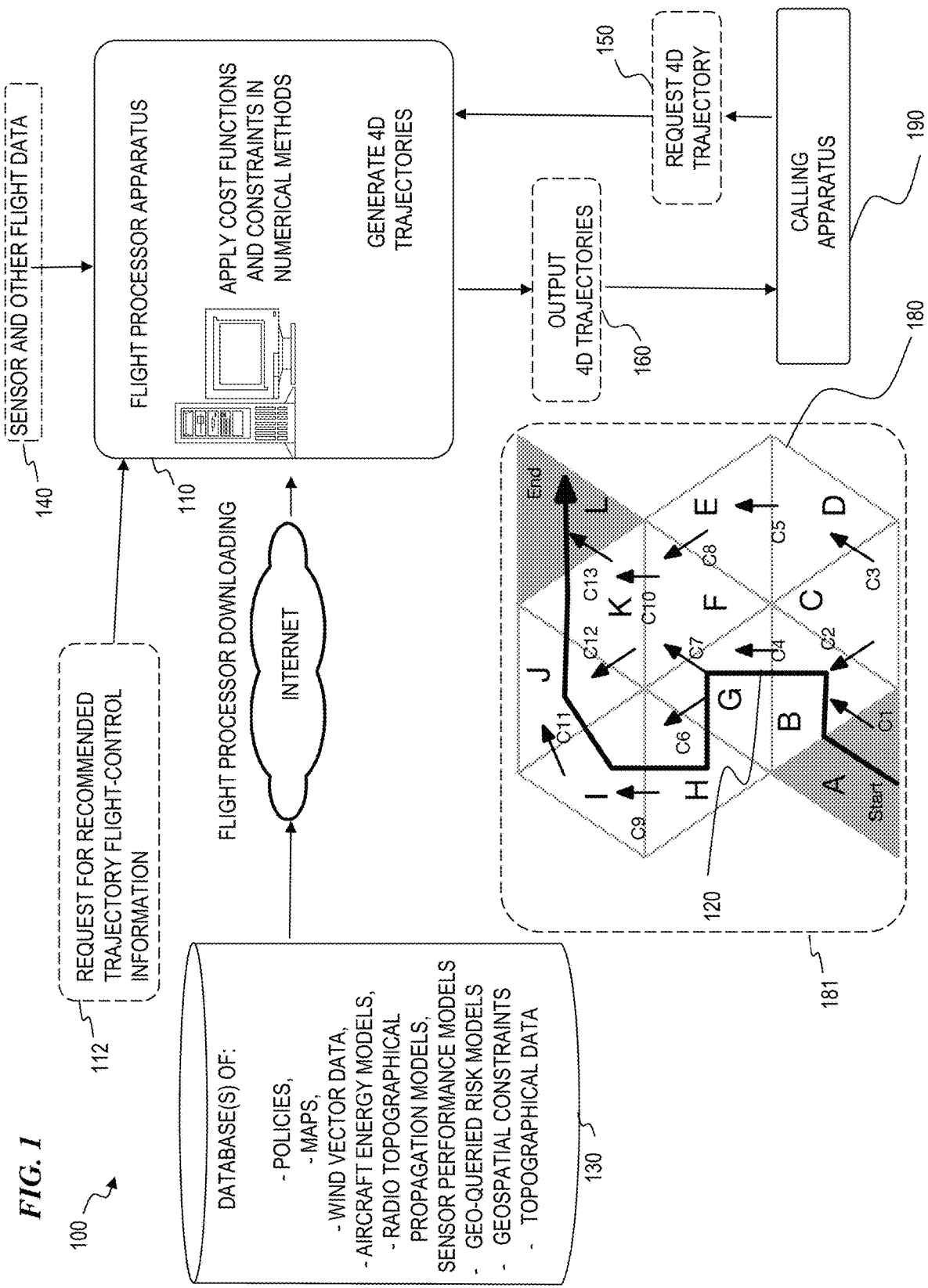
FIG. 1 is a block diagram of a cost-optimized system 100 for unmanned drones, according to some embodiments of the present invention. The diagram depicts a calling apparatus 150 (examples of which include, but are not limited to, a flight management system, drone flight computer or cloud-based web application) that requests a trajectory and receives an optimized or constraint-optimized trajectory 160. The flight processor apparatus 110 computes the trajectory using numerical methods and/or graph or mesh-based decompositions of the flight space.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The terminology used herein is for the purpose of describing particular embodiments and processes only and is not intended to be limiting of the invention. As used herein, the term "and/or" includes any and all combinations of one or more of the listed items, capabilities or constraints. As used herein, the singular "a," "an," and "the" are intended to include the plural forms as well as the singular forms, unless the context clearly indicates otherwise. It will be further understood that the terms "includes," "comprises" and/or "comprising," when used in this specification, specify the presence, in some embodiments, of stated features, capabilities, steps, operations, elements, constraints and/or components, but do not preclude the presence or addition of one or more other features, capabilities, steps, operations, elements, constraints and/or components, and/or groups thereof.

Unless otherwise defined, all terms (including technical and scientific terms) used herein have the same meaning as commonly understood by one having ordinary skill in the art to which this invention belongs. It will be further understood that terms, such as those described in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Apparatus and methods for minimizing UAS trajectory costs with respect to a variety of inputs and constraints are discussed herein. In the following description, for the purposes of explanation, numerous specific details are set forth in order to provide a thorough understanding of the present invention. It will be evident, however, to one skilled in the art that the present invention may be practiced without these specific details.

Furthermore, in addition to energy costs, other costs and constraints may factor into a trajectory design. For example, fixed or bounded AGL altitudes may impose noise abatement problems as well as privacy issues with regard to proximity to certain structures, people and other aircraft operations. Risks may be modeled in a discrete or continuous time and/or location capacity, based on an aircraft model, world model and a system fault/failure tree relating the two based on probabilistic costs of risks associated with flight mission failures.

Unmanned aircraft can possess different levels of autonomy. Whether in the planning, in-flight, or post-flight processes, the decision logic to select a trajectory may need to consider many factors beyond just energy. This imposes a variety of constrained optimization problems on the cost-based trajectory generation system. In addition to minimizing cost of fixed AGL flight, a UAS may need to support bounding of AGL or MSL altitudes to accommodate other types of policies, restricted airspace geo-fencing, sensor constraints and quality of radio frequency signal needed for real-time communications. The fixed MSL energy-optimized trajectory generation processes used for manned aviation do not meet the needs of current and growing unmanned aircraft operations and the mission types they seek to satisfy. Wind vector information is critical to the computation of the energy-associated costs. Wind vector data, preferably high resolution and four-dimensionally represented (especially when close to topographical features such as ridge lines, mountains, etc.), frequently represents one of the largest cost factors in performing a flight from a specified origin to a destination.

The present disclosure is to be considered as an exemplification of the invention, and is not intended to limit the invention to the specific embodiments illustrated by figures, description below, or specific examples provided.

The present invention will now be described by referencing the appended figures representing some preferred embodiments.

FIG. 1 is a block diagram of a cost-optimized system 100 for unmanned drones. In some embodiments, system 100 includes a flight processor apparatus 110 receiving inputs (130, 140) from a calling apparatus 190 for computing cost-optimized trajectories or trajectory segments 120. In some embodiments, the inputs include data (such as, for example, high resolution wind vector data, map and other geospatial constructs, sensor proximal performance data, communications performance data, etc.) received from database(s) 130 and/or sensors 140. In some embodiments, the flight processor 110 provides outputs, such as a 4-D computed trajectory (or trajectories) 150, that are communicated to the calling apparatus 190 (as shown and described below). In some embodiments, a diagram 181 presents a graphical view of the output set of 4-D trajectory segments 120 on a top-view grid representation of the terrain from starting grid area A to ending grid area L. In some embodiments, the possible or contemplated grid-area to grid-area crossings are indicated as "C" appended to a numerical value, wherein C1 is the crossing from grid area A to grid area B, C2 is the crossing from grid area C to grid area B, C3 is the crossing from grid area C to grid area D, and so on.

Figure 2:
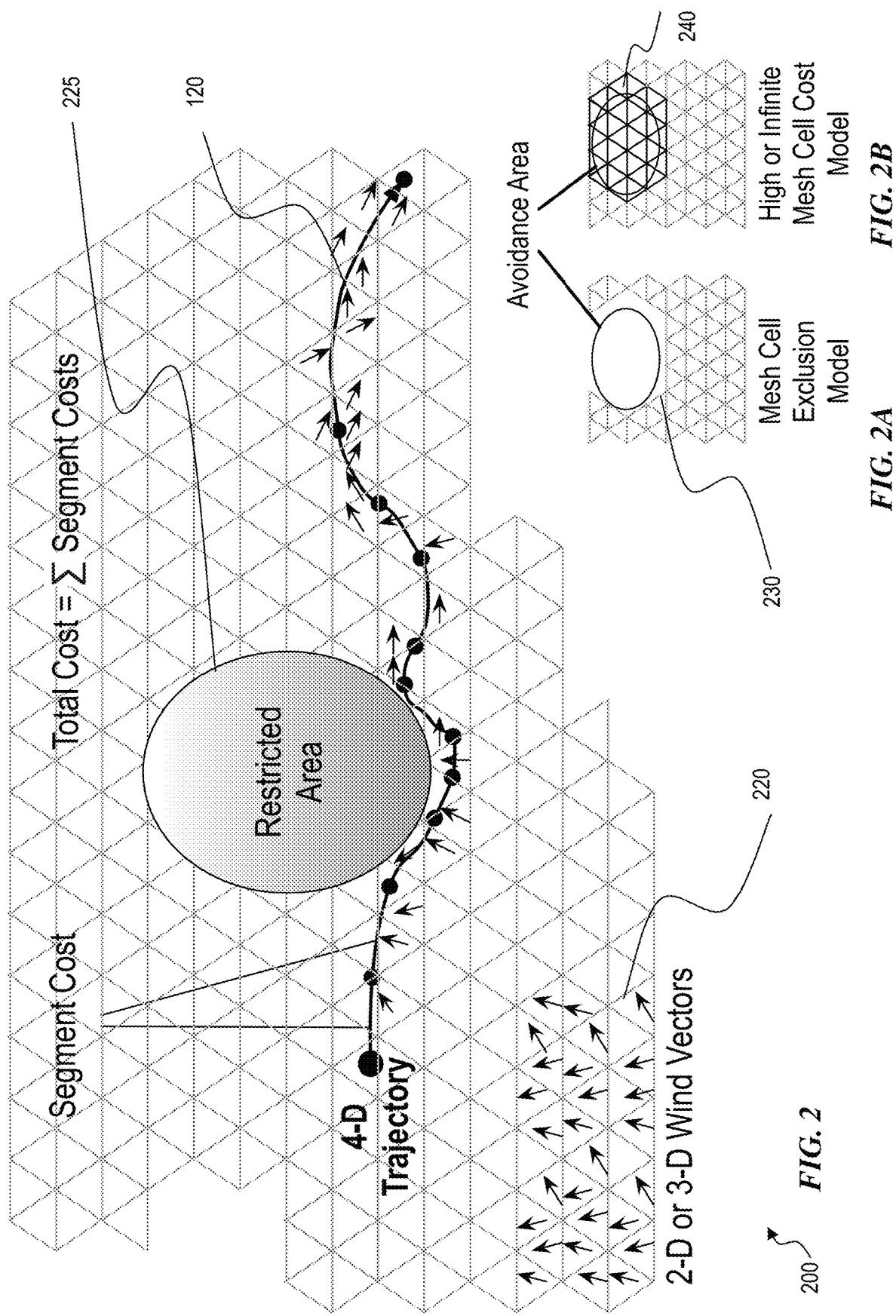

One embodiment of the invention (FIG. 1) includes a flight processor device 110 receiving input from one or databases or sensor elements; input includes data such as: current or forecasted wind vector data (2-dimensional or 3-dimensional, with magnitude and variability—FIG. 2-220); geospatial structures representing blacklisted (no-fly) or white-listed (stay within) flight zones (FIG. 2); topographical and ground-feature maps; risk-based attributes; sensor minimum performance criteria; and radio and other EM spectrum minimum performance criteria influenced by transceiver location, local noise, terrain, and altitude.

The flight processor apparatus 110 uses input data to compute a cost-optimized trajectory 120 using a numerical path planning optimization method, such as, but not limited to, the family of Fast Marching or Ordered upwind algorithms performed over a multi-dimensional mesh, Dijkstra's shortest-path algorithm computed over a statically defined grid, and other graph, tree and mesh-based alternatives. Computed trajectories consist of two or more tuples of location, altitude, time and segment cost (the cost of traversing from the beginning to the end of the 4-D trajectory segment, which may be only a few mesh cells, grid segments or an entire flight path). The flight processor apparatus provides the trajectories or trajectory elements to a calling apparatus 190 (examples of which are flight planning systems or aircraft control/guidance systems) for the purposes of flight path design (FIG. 1 reference number 150) whether open or closed-loop controlled.

Figure 3:
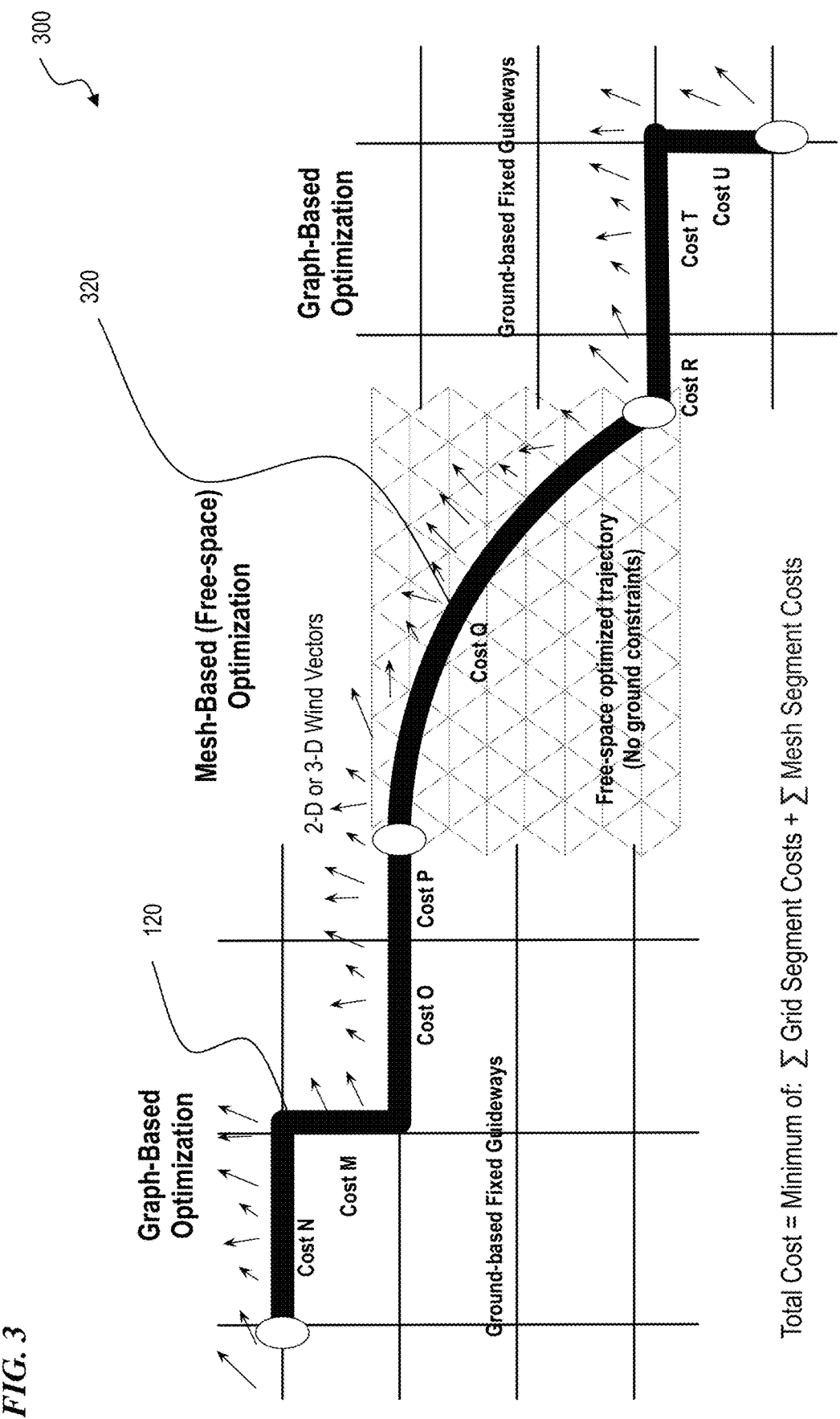
FIG. 3 is a schematic top-view mesh-based diagram 300 of a computed optimized-cost flight path 120, according to some embodiments of the present invention. In some embodiments, the flight processor computes a composite trajectory consisting of a sequence of one or more ground (Fixed Guideway) constraint cost-optimized segments and free-space (mesh-based cost minimization) optimized segments.
Figure 4:
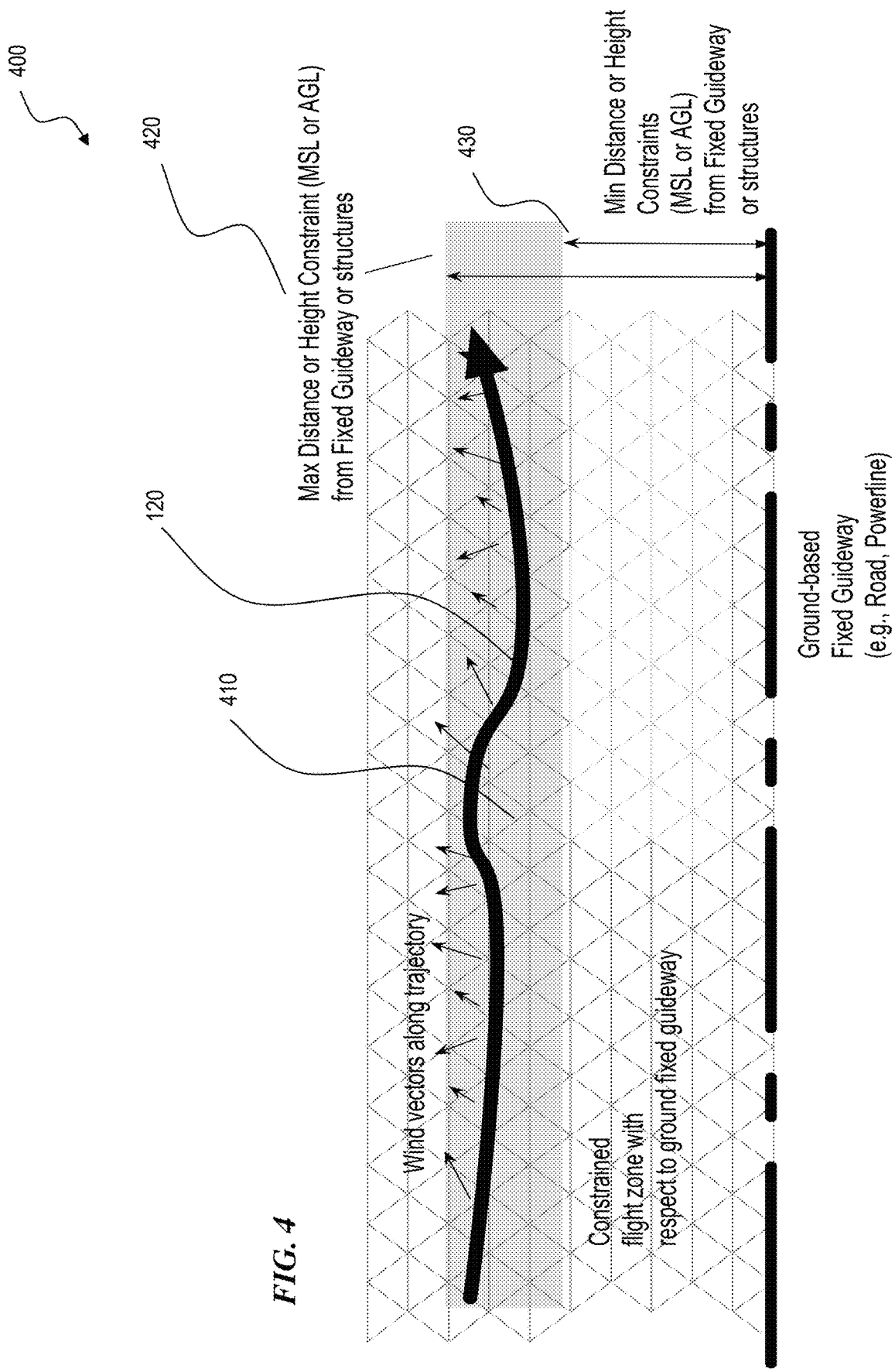
FIG. 4 is a schematic side or top-view distance-constrained-flight-zone diagram 400 of a computed constrained-zone optimized-cost flight path 120, according to some embodiments of the present invention. The flight processor apparatus computes cost-optimized, but spatially constrained separation trajectory from the ground-based guideway. Altitude constraints are vertical separations from object and can be above mean-sea-level (MSL) or above ground (AGL). Side distance constraints are lateral separations (minimum and maximum thresholds) from the object.
Figure 5:
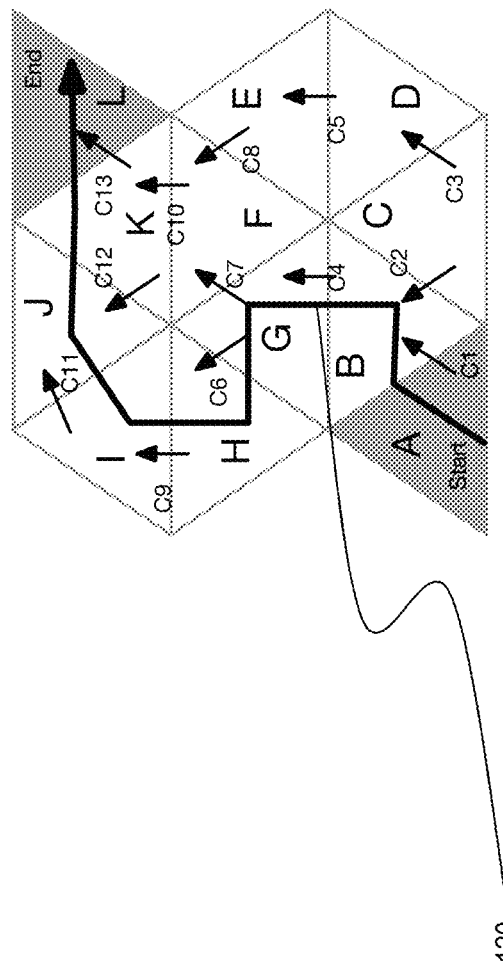
FIG. 5 is a representation 500 of risk-based calculation of a trajectory. The Flight processor apparatus computes optimized trajectory 120 based on risk-based cost function applied to mesh cell traversal through trajectory elements.
Figure 6:
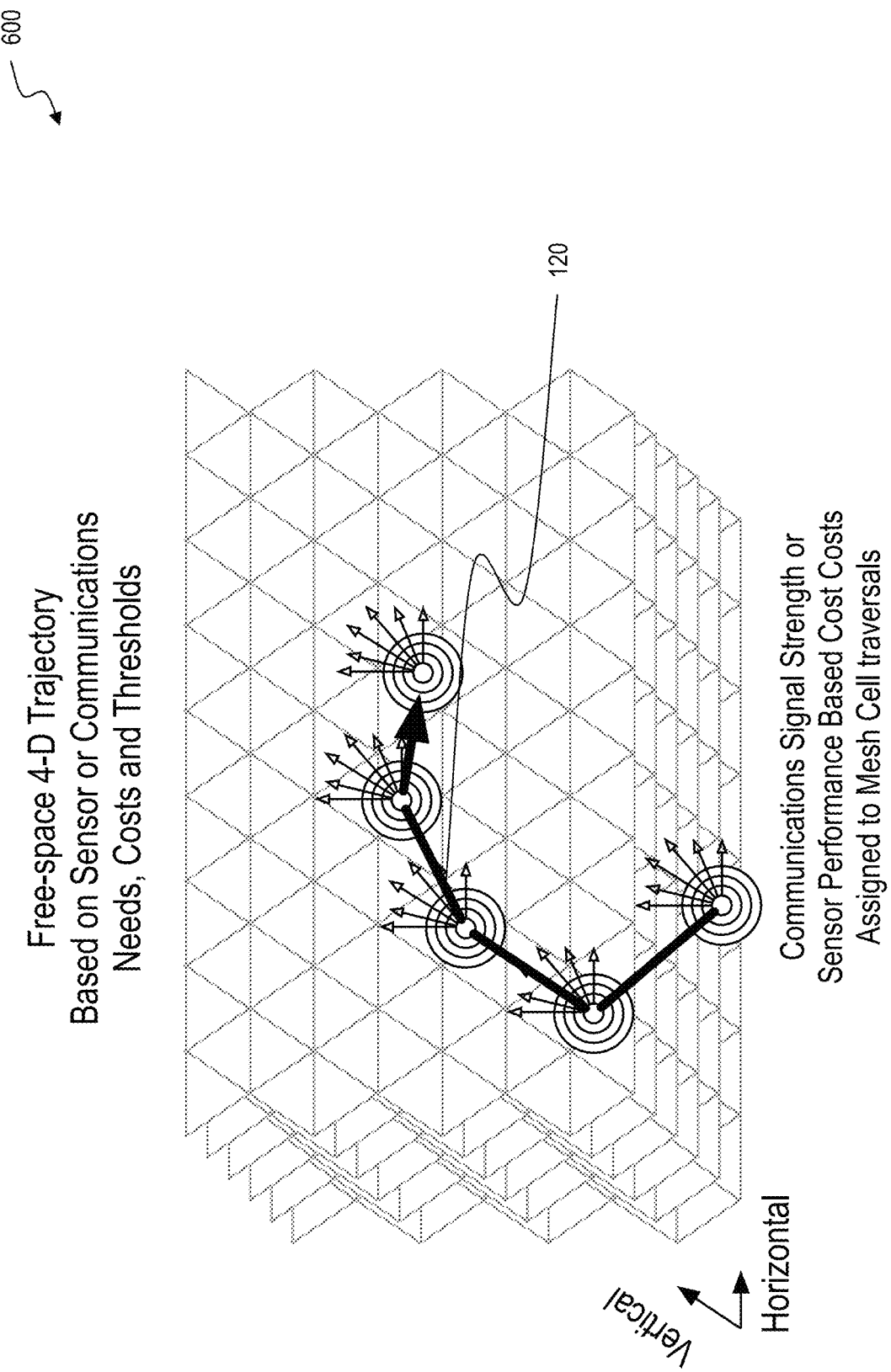
FIG. 6 is a representation 600 of a flight processor apparatus optimized trajectory 120 based on communication system performance (e.g., radio frequency signal to noise ratios), navigation aid performance (e.g., GPS or GPS augmentation systems) requirements or sensor performance constraints (e.g., range, lighting, location and time of day, ground temperature, and/or topographically influenced incidence angles to the aircraft) as represented in cost-driven mesh cell traversal in the computed trajectory.
Figure 7:
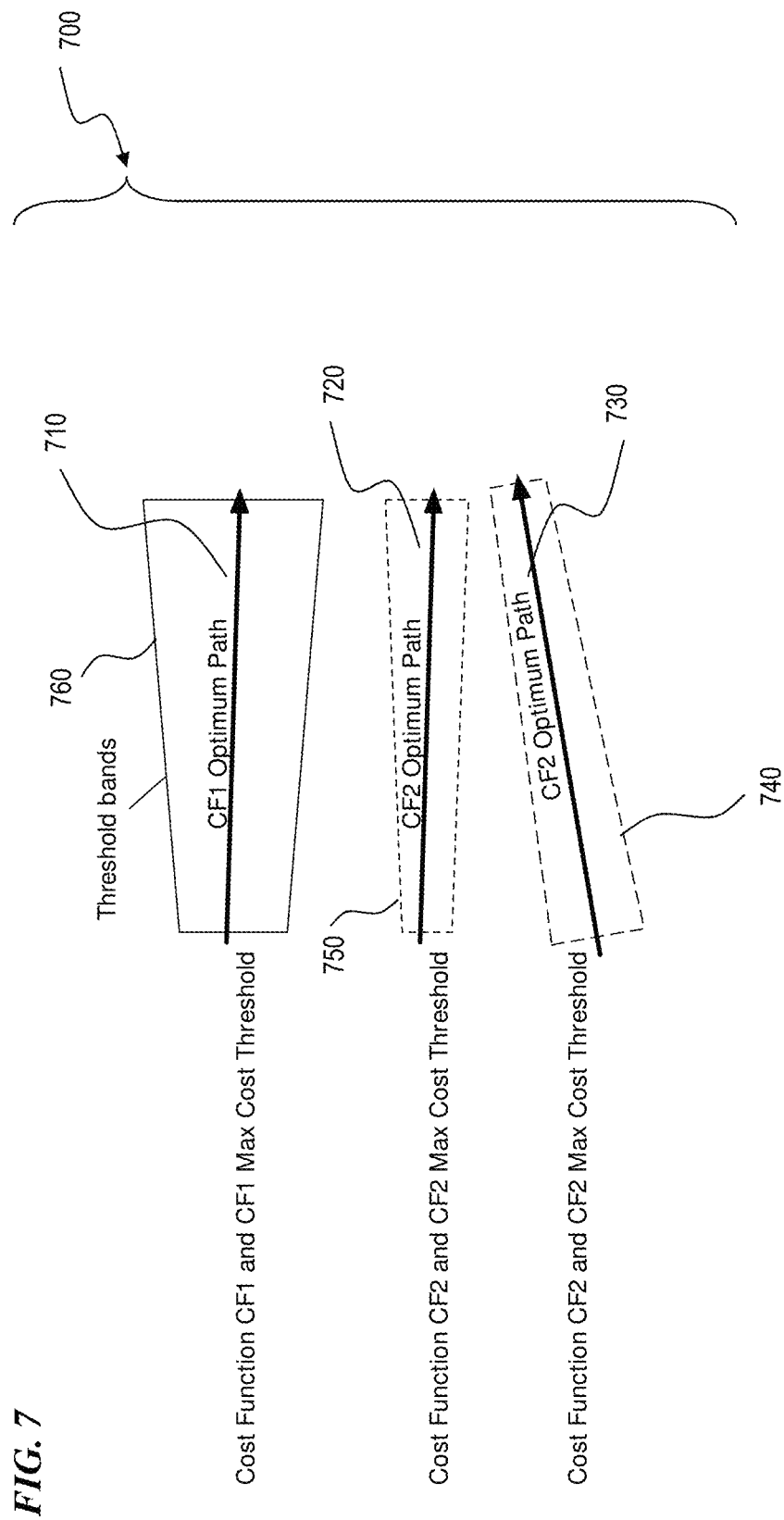
FIG. 7 is a representation 700 of multiple cost-optimized trajectories in the same mesh, each with the same starting and ending point; each trajectory 710, 720, 730 is computed from a different cost function which may or may not have any relation to the others. In addition to the optimized trajectory, the trajectory generator also outputs threshold bands 740, 750, 760 which represent the user-defined threshold (i.e. maximum allowed cost) for each given trajectory and cost function.

The flight processor apparatus may compute a trajectory wherein the trajectory must conform to a grid defined by a ground-based guideway such as a road, electrical transmission line, railway, ground easement or other such constraint (FIG. 3-310).

The flight processor apparatus may compute—using different numerical methods—more than one trajectory, including a composite trajectory 320, in which the beginning and ending locations of each comprise an ordered sequence of locations and times useful for priority-based routing (FIG. 3). The final trajectory 320 may be a concatenation of the composite trajectories (sub-trajectories) wherein flight time, energy, cost and other state data is seamlessly maintained through the sub-trajectories to provide an accurate, optimized whole-trajectory.

The flight processor apparatus may accept cost-impacting policies and constraints (FIG. 1—130) that it uses to modify the trajectory or component cost function, mesh structure design and/or vertical or lateral separations imposed on the trajectory or sub-trajectories.

The flight processor apparatus may base trajectory generation constraints on minimum or maximum lateral/vertical separation distances from ground-based guideways or other objects (FIG. 4—410, 420, 430). This type of computation may be needed to optimize a trajectory with a stand-off distance requirement to a road, electrical transmission line or other guideway type, for the purposes of, for example, adhering to safety-related or legal policies, or meeting sensor standoff requirements for sensor performance reasons.

The flight processor apparatus may base trajectory optimizations on other cost functions, such as those that minimize time or risk of traversing the trajectory.

Figure 8:
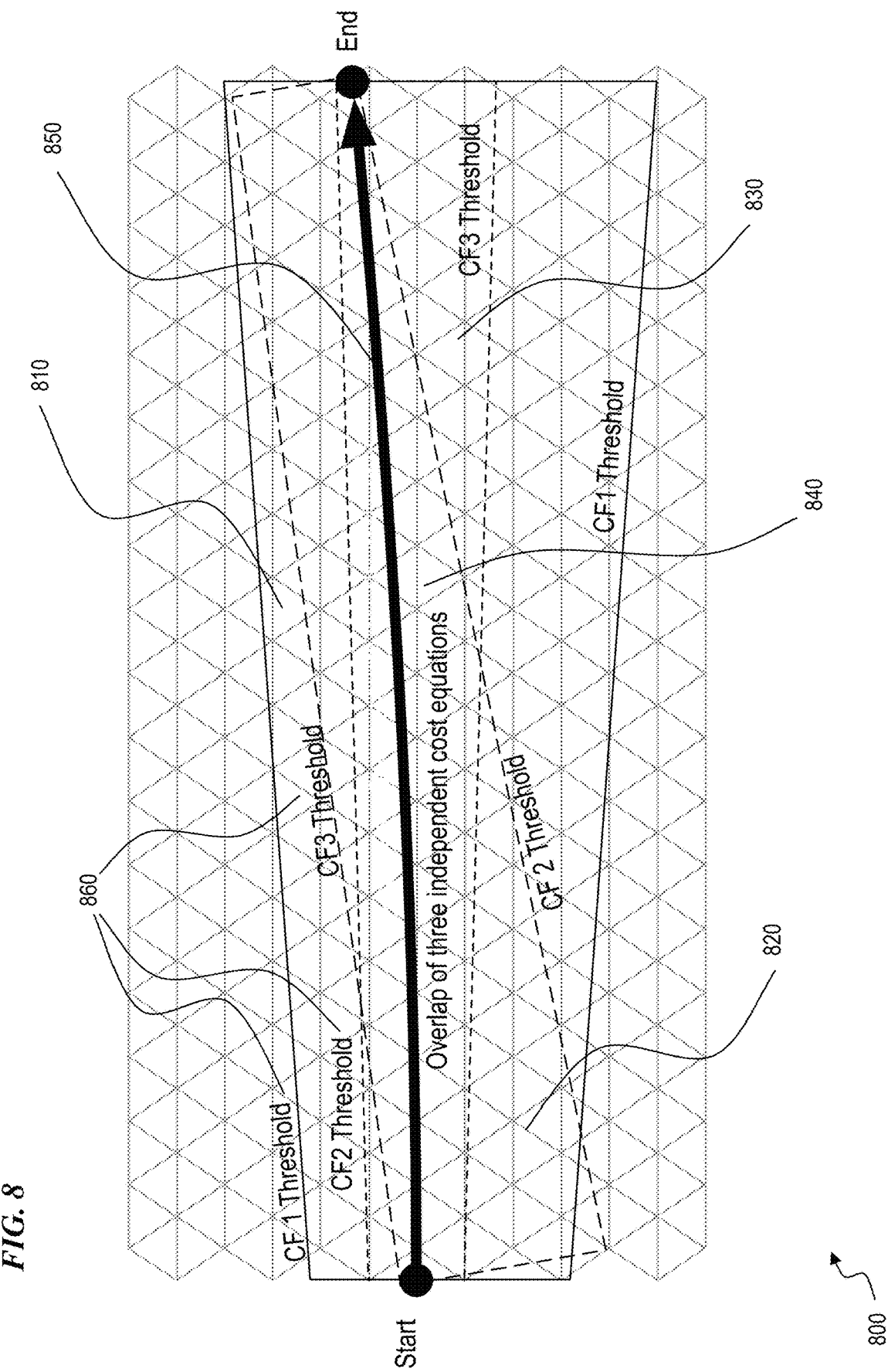
FIG. 8 is a representation of multiple cost-optimized trajectories 810, 820, 830, each with unique cost bounds (thresholds) 860 superimposed, and the overlap of the bounds defines a new region 840 (darkest shading) in which a chosen trajectory simultaneously meets the cost thresholds of each separately cost-computed (and optimized trajectory). The system may select or generate a further optimized trajectory 850 within this region by weighting (favoring) the trajectory computed from one or more of the trajectory computation cost models.
Figure 9:
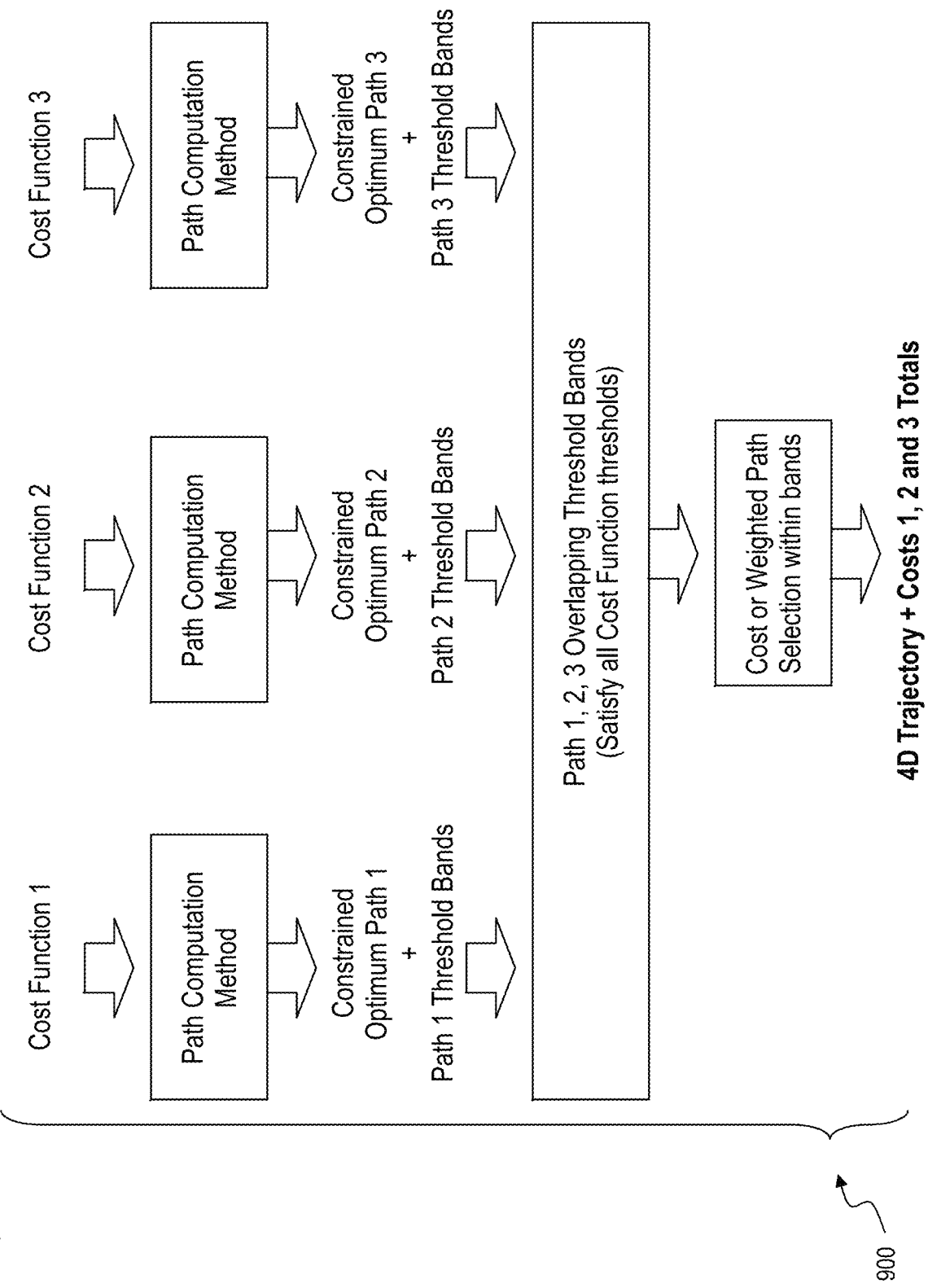
FIG. 9 is a representation 900 of a computational flow pertaining to FIG. 8 wherein each trajectory (from a given startling location and time, to a given destination) is computed using a separate cost function and cost threshold allocation. The result of each is a band of allowed trajectories that may overlap to enable computation or selection of a trajectory meeting all, or a subset, of the defined trajectories' cost thresholds.
Figure 10:
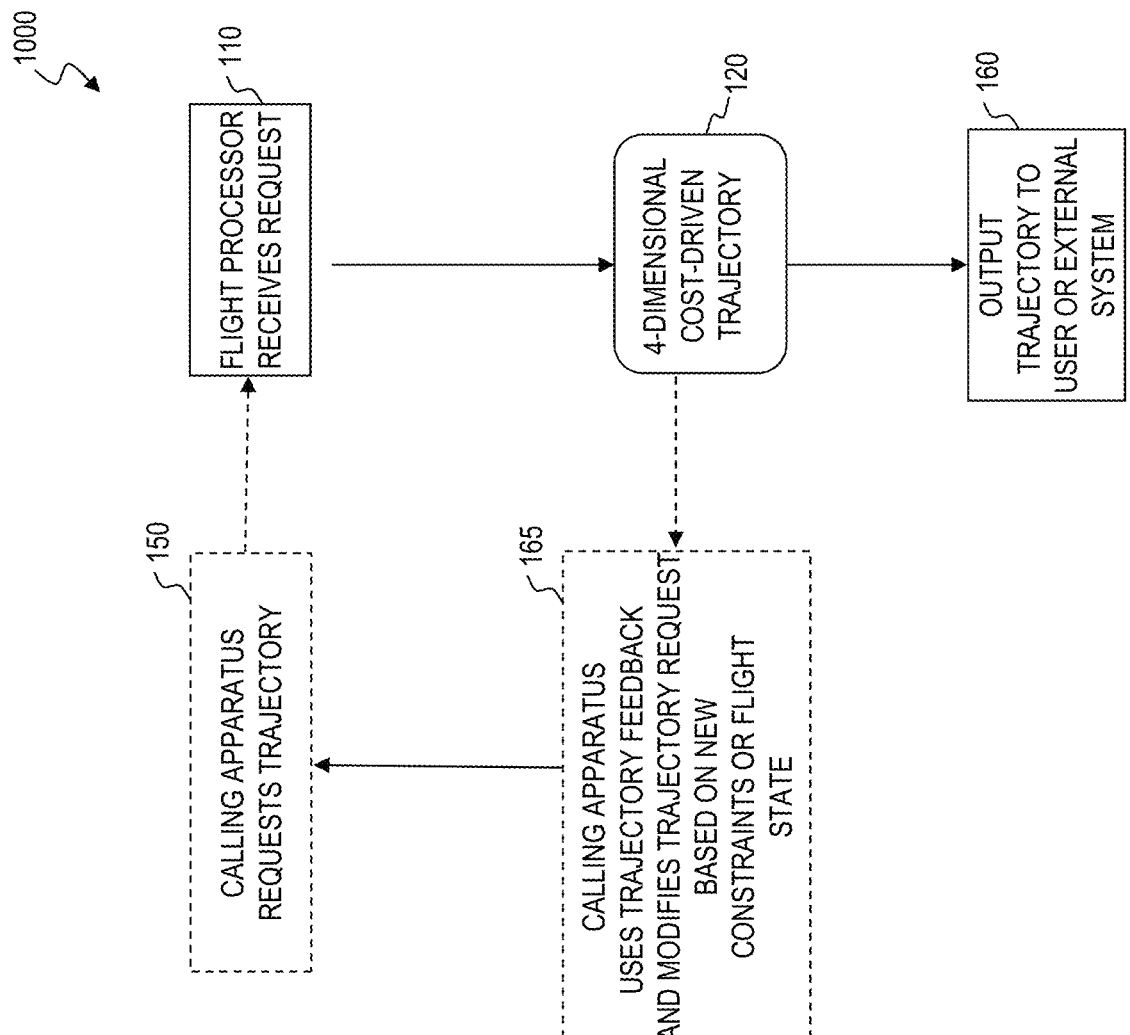
FIG. 10 is a representation 1000 of a flight processor apparatus 110 receiving a trajectory request, computing a trajectory, feeding the trajectory back 165 to the calling apparatus which then modifies the request based on new constraints or flight state. The modified trajectory request is then sent to the flight processor apparatus 150.

The flight processor apparatus may also generate multiple possible trajectories from a common origin and start time to a common destination, however each based on a different cost function (FIG. 7—710, 720, 730). For example, one cost function may be based on optimizing energy consumption (e.g., due to wind or other atmospheric data, fuel capacity, etc.); another may be based on risk (e.g., population density or ground structure types on the ground, time of day, location, policies, financial, etc.); another trajectory may be computed based on a radio communication device's proximity requirement to other transceivers, navigation aids (position-navigation and timing) or other sensor systems in order to maintain a signal to noise ratio (SNR) that ensures adequate communication of requisite flight or payload data. Each of the cost functions may use common or non-overlapping inputs, as appropriate and may or may not be dependent on each other. Each of the trajectories will include cost thresholds (FIG. 8—860) that limit each cost-driven trajectory to a range of allowed trajectory spaces (FIG. 8—810, 820, 830) available to further optimization. The overlap of the multiple trajectory spaces defines the range of trajectories that meets all of the cost-defined thresholds, a space from which weighting (i.e., favoring one cost-defined trajectory over another) or other sub-optimization method may be applied to select or define a single trajectory that meets all cost thresholds. Using the previous example, an optimized trajectory 850 contained within 840 would follow spatial cost gradients that simultaneously meet the energy consumption threshold, risk threshold and communication cost threshold constraints.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

Each of the claims contained in this application extends from prior art identified above (a published 2017 U C Berkeley PhD thesis of Z. Liu), which is, namely, a computational process whereby a flight processor calculates energy costs associated with broad-based and hyper-local wind and other atmospheric data, forecast atmospheric data, aircraft energy consumption model data, modulated airspeed, desired groundspeed, aerodynamic drag, and other energy enhancing and depletive flight effects along a proposed or actual trajectory segment or range of possible segments. The prior art just mentioned, is entirely energy-driven, and this invention extends to a variety of other optimization types, notably those concerning risk (which may include energy constraints in addition to many others).

In some embodiments, the present invention provides a flight processor apparatus performing a method that includes:

receiving a request from a calling apparatus for a flight path from a first geographical location to a second geographical location, for an unmanned aerial vehicle to travel;

receiving sensed or forecast cost data (risk, energy, flight state, wind information) and optionally cost constraints, for the intermediate geographical locations between the first geographical location and the second geographical location;

using an aerial vehicle energy consumption model data, computing a cost-optimized flight path for the unmanned aerial vehicle to travel between the first geographical location and the second geographical location;

using discrete, continuous time, and/or probabilistic risk models in the calculation of trajectory cost; and controlling or evaluating the unmanned aerial vehicle, or its mission, according to the cost-optimized flight path.

In some embodiments, the computed total trajectory or trajectory segment cost is minimized for any constant or variable AGL, MSL, or both AGL and MSL altitude constraints via application of a tailored mesh or grid structure, or via application of a tailored cost function that enforces constraints on the cost optimization applicable to the grid or mesh.

In some embodiments, the flight processor apparatus uses a cost function input to the trajectory optimization numerical method based on non-energy cost parameters.

In some embodiments, the flight processor apparatus uses a cost function input to the trajectory optimization numerical method based on risk-based cost parameters to minimize total segment or trajectory mesh or grid traversal, risk-related costs.

In some embodiments, the flight processor apparatus uses the lowest computed cost of the trajectory or component thereof ensures avoidance of restricted airspace by modeling the restricted airspace as either 1) a region in which no grid segments or mesh cells are defined (for the numerical method to computer over), or 2) a cost function that assigns heightened or infinite cost to the restricted area grid or mesh elements to ensure the optimized trajectory does not intersect the restricted area space.

In some embodiments, the flight processor apparatus represents restricted airspace as a 3-dimensional envelope around one or more moving or static aircraft or ground vehicles to ensure the computed aircraft trajectory does not share the volume in a given space-time envelope.

In some embodiments, the flight processor apparatus continuously updates least cost trajectories for multiple destinations for the purposes of identifying contingency landing locations or ascertaining the cost-optimized ordering of a sequence of intermediate destinations in a given flight.

In some embodiments, the flight processor apparatus uses a mesh or grid structure(s) conforming to a ground network that includes a sequence of guideway indicators to compute a numerical method-optimized trajectory, wherein the sequence of guideway indicators includes a plurality of guideway indicators selected from the set consisting of roads, property easements, electrical lines, communication lines, gas lines, railway lines, and building structures. In some embodiments, other such guideway indicators are included.

In some embodiments, the flight processor apparatus computes a composite trajectory consisting of one or more segments that are constrained to ground-based guideways and one or more segments that are not constrained to ground-based guideways and are defined in free-space. An example of this is when the unmanned aircraft follows the ground structure for a period of time, departs it through an optimized free-space trajectory, then intersects and conforms its flight trajectory to another ground-based constraint. In some embodiments, this method may invoke multiple, disparate meshes and/or grid and graph structures to the different ground-constrained non-ground-constrained flight segments.

In some embodiments, the flight processor apparatus computes a cost-optimized trajectory constrained to a minimum, maximum, or minimum and maximum horizontal or vertical stand-off distance from the plurality of ground-based guideway indicators selected from the set consisting of roads, property easements, electrical lines, communication lines, gas lines, railway lines, and building structures.

In some embodiments, the flight processor apparatus augments the optimal trajectory with a range of sub-optimal but cost-compliant threshold trajectories that define a trajectory space (or 'band') through which a maximum but acceptable threshold cost is maintained.

In some embodiments, the flight processor apparatus computes multiple trajectories for a given starting location and time to a given destination location, or series of locations, where each trajectory is based on a different cost optimization function.

In some embodiments, the flight processor apparatus computes independent, but allowed trajectory bands for each trajectory based on each one's allowed cost threshold.

In some embodiments, the flight processor apparatus computes a composite trajectory satisfying multiple, allowed (and computed) trajectory computation's independent cost thresholds.

In some embodiments, the flight processor apparatus computes or selects a further optimized or weighted trajectory within the cost-allowed trajectory bands of multiple, independently computed trajectory spaces.

In some embodiments, the flight processor apparatus applies a cost minimization function designed to ensure a minimum sensor or Radio Frequency Signal-to-Noise ratio (SNR) for communications or navigation aid quality.

In some embodiments, the flight processor apparatus applies a cost minimization function that enables computation of a trajectory that meets a sensor performance and limitation threshold.

In some embodiments, the flight processor apparatus applies uses a cost minimization function for minimizing risk based on an ontologically-defined world model of the flight environment and a known relationship of that world model to a probabilistic or non-probabilistic risk model such as—but not limited to—one described as a fault or failure tree.

In some embodiments, the flight processor apparatus applies a cost minimization function designed to minimize trajectory time.

Some embodiments of the invention include a flight processor able to calculate a 4-dimensional trajectory having a sequence of two or more position, time and cost (x, y, z, t, c) tuples that minimize a defined cost, and use such cost function as the means to define various constraints, whether policy or performance-based. Cost is frequently expressed as energy, a term that is in limited supply on the flight vehicle. Furthermore, the invention enables generation of cost-optimized trajectories with simple or complex constraints and bounds (for the entire trajectory, or a component segment thereof) such as fixed AGL altitude; minimum AGL altitude; maximum AGL altitude; minimum MSL; maximum MSL; avoidance of restricted airspace; adherence to non-restricted airspace such as easements; adherence to ground-based guideways, if applicable; and the constraint to maintain adequate radio frequency signal-to-noise needed for communications to the ground station or backhaul systems. Constraint-enabled minimization of trajectory cost may leverage the aircraft's energy model; current atmospheric data (most notably wind vector data along the trajectory path); continuous-time and/or event-based risk models and fault trees; blacklisted and white-listed geofence boundaries; defined easements; and known or estimated RF signal-to-noise (SNR) minimum values needed for one or two-way communications. Cost minimization may include energy, risk, time, distance, sensor, position-navigation-and-timing (PNT), communications quality and costs of non-adherence to flight policies.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. A method for generating a cost-optimized trajectory for an unmanned aerial vehicle to travel, and for controlling the unmanned aerial vehicle according to the cost-optimized trajectory, the method comprising:
    receiving a request from a calling apparatus for the cost-optimized trajectory, wherein a flight path of the cost-optimized trajectory extends from a first geographical location to a second geographical location;
    for each one of a plurality of intermediate geographical locations between the first geographical location and the second geographical location, receiving a plurality of cost-function inputs associated with a cost function of the cost-optimized trajectory, wherein the plurality of cost-function inputs includes a risk model and at least one selected from the group consisting of energy, flight state, and wind information;
    using the plurality of cost-function inputs, generating the cost-optimized trajectory for the unmanned aerial vehicle to travel between the first geographical location and the second geographical location, wherein the cost-optimized trajectory includes the flight path and associated time data, and a trajectory cost, and wherein the trajectory cost includes risk;
    controlling the unmanned aerial vehicle according to the cost-optimized trajectory; and minimizing the trajectory cost for at least one altitude constraint selected from the group consisting of above-ground-level (AGL) and mean-sea-level (MSL), wherein the minimizing includes applying a tailored cost function that enforces the at least one altitude constraint on a cost optimization applicable to a mesh over which the cost-optimized trajectory is computed.

2. The method of claim 1, wherein the plurality of cost-function inputs includes sensed data.

3. The method of claim 1, wherein the plurality of cost-function inputs includes forecast data.

4. The method of claim 1, wherein the plurality of cost-function inputs includes constraints that the cost function cannot violate.

5. The method of claim 1, wherein the cost function uses non-energy cost parameters.

6. The method of claim 1, wherein the cost function uses risk-based cost parameters to minimize total segment, risk-related costs.

7. The method of claim 1, wherein the generating of the cost-optimized trajectory includes computing a lowest trajectory cost that ensures avoidance of restricted airspace by modeling the restricted airspace as one selected from the group consisting of a region in which no grid segments are defined, and a cost function that assigns heightened cost to a restricted area grid to ensure the cost-optimized trajectory does not intersect the restricted airspace.

8. The method of claim 1, further comprising representing restricted airspace as a 3-dimensional envelope around at least one aircraft to ensure the cost-optimized trajectory does not share the 3 dimensional envelope in a given space-time envelope.

9. The methods of claim 1, further comprising continuously updating least cost trajectories for a plurality of destinations for identifying contingency landing locations.

10. The method of claim 1, wherein the generating of the cost-optimized trajectory includes using at least one mesh structure conforming to a sequence of ground guideway indicators, wherein the sequence of ground guideway indicators includes a plurality selected from the set consisting of roads, property easements, electrical lines, communication lines, gas lines, railway lines, and sequence of structures.

11. The method of claim 1, further comprising computing a composite trajectory that includes at least a first segment constrained to ground-based guideways and at least a second segment not constrained to ground-based guideways and defined in free-space.

12. The method of claim 1, wherein the generating of the cost-optimized trajectory includes constraining the cost-optimized trajectory to a stand-off distance from ground-based guideways.

13. The method of claim 1, further comprising augmenting the cost-optimized trajectory with a range of sub-optimal but cost-compliant threshold trajectories that define a trajectory space through which an acceptable threshold cost is maintained.

14. The method of claim 1, wherein the generating of the cost-optimized trajectory includes computing a plurality of trajectories for a given starting location and time to a given destination location, where each trajectory of the plurality of trajectories is based on a different cost optimization function.

15. The method of claim 14, further comprising computing independent but allowed trajectory bands for each trajectory of the plurality of trajectories based on an allowed cost threshold for each trajectory of the plurality of trajectories.

16. The method of claim 1, further comprising computing a composite trajectory satisfying multiple, allowed independent cost thresholds.

17. The method of claim 15, further comprising computing a further optimized trajectory within the independent but allowed trajectory bands.

18. The method of claim 1, wherein the generating of the cost-optimized trajectory includes applying a cost minimization function designed to ensure a minimum sensor Signal-to-Noise ratio (SNR) for communications quality.

19. The method of claim 1, wherein the generating of the cost-optimized trajectory includes applying a cost minimization function that enables computation of a performance-and-limitation trajectory that meets a sensor performance and limitation threshold.

20. The method of claim 1, wherein the generating of the cost-optimized trajectory includes using a cost minimization function for minimizing risk based on an ontologically-defined world model of a flight environment and a known relationship of the world model to a probabilistic risk model.

21. The method of claim 1, wherein the generating of the cost-optimized trajectory includes applying a cost minimization function designed to minimize trajectory time.

22. The method of claim 1, wherein the at least one altitude constraint is a variable constraint.

23. The method of claim 1, wherein the risk model includes a discrete time and location risk model.

24. A non-transitory computer-readable medium having instructions stored thereon that when executed by a processor execute a method for generating a cost-optimized trajectory for an unmanned aerial vehicle to travel, and for controlling the unmanned aerial vehicle according to the cost-optimized trajectory, the method comprising:
receiving a request from a calling apparatus for the cost-optimized trajectory, wherein a flight path of the cost-optimized trajectory extends from a first geographical location to a second geographical location;
for each one of a plurality of intermediate geographical locations between the first geographical location and the second geographical location, receiving a plurality of cost-function inputs associated with a cost function of the cost-optimized trajectory, wherein the plurality of cost-function inputs includes a risk model and at least one selected from the group consisting of energy, flight state, and wind information;
using the plurality of cost-function inputs, generating the cost-optimized trajectory for the unmanned aerial vehicle to travel between the first geographical location and the second geographical location wherein the cost-optimized trajectory includes the flight path and associated time data, and a trajectory cost, and wherein the trajectory cost includes risk;
controlling the unmanned aerial vehicle according to the cost-optimized trajectory; and
minimizing the trajectory cost for at least one altitude constraint selected from the group consisting of above-ground-level (AGL) and mean-sea-level (MSL), wherein the minimizing includes applying a tailored cost function that enforces the at least one altitude constraint on a cost optimization applicable to a mesh over which the cost-optimized trajectory is computed.

25. An apparatus for generating a cost-optimized trajectory for an unmanned aerial vehicle to travel, and for controlling the unmanned aerial vehicle according to the cost-optimized trajectory, the apparatus comprising:
a computer having software that:
receives a request from a calling apparatus for the cost-optimized trajectory, wherein a flight path of the cost-optimized trajectory extends from a first geographical location to a second geographical location;
for each one of a plurality of intermediate geographical locations between the first geographical location and the second geographical location, receives a plurality of cost-function inputs associated with a cost function of the cost-optimized trajectory, wherein the plurality of cost-function inputs includes a risk model and at least one selected from the group consisting of energy, flight state, and wind information;
uses the plurality of cost-function inputs to generate the cost-optimized trajectory the unmanned aerial vehicle to travel between the first geographical location and the second geographical location wherein the cost-optimized trajectory includes the flight path and associated time data, and a trajectory cost, and wherein the trajectory cost includes risk;
controls the unmanned aerial vehicle according to the cost-optimized trajectory; and
minimizes the trajectory cost for at least one altitude constraint selected from the group consisting of above-ground-level (AGL) and mean-sea-level (MSL) such that a tailored cost function is applied that enforces the at least one altitude constraint on a cost optimization applicable to a mesh over which the cost-optimized trajectory is computed.

\* \* \* \* \*